United States Patent
Wöeste et al.

(10) Patent No.: US 8,097,830 B2
(45) Date of Patent: Jan. 17, 2012

(54) METHOD FOR MATERIAL PROCESSING AND/OR MATERIAL ANALYSIS USING LASERS

(75) Inventors: Ludger Wöeste, Berlin (DE); Jean-Pierre Wolf, Lyons (FR)

(73) Assignee: Freie Universitaet Berlin, Berlin (DE)

( * ) Notice: Subject to any disclaimer, the term of this patent is extended or adjusted under 35 U.S.C. 154(b) by 773 days.

(21) Appl. No.: 10/508,662

(22) PCT Filed: Feb. 28, 2003

(86) PCT No.: PCT/EP03/02074
§ 371 (c)(1), (2), (4) Date: Feb. 2, 2005

(87) PCT Pub. No.: WO03/080284
PCT Pub. Date: Oct. 2, 2003

(65) Prior Publication Data
US 2005/0127049 A1 Jun. 16, 2005

(30) Foreign Application Priority Data
Mar. 22, 2002 (DE) .................................. 102 13 044

(51) Int. Cl.
*B23K 26/00* (2006.01)
(52) U.S. Cl. ............. 219/121.85; 219/121.61; 219/121.6
(58) Field of Classification Search ............. 219/121.85, 219/121.61, 121.6
See application file for complete search history.

(56) References Cited

U.S. PATENT DOCUMENTS

| | | | |
|---|---|---|---|
| 3,571,555 A * | 3/1971 | Townes et al. | 219/121.72 |
| 3,575,602 A * | 4/1971 | Townes et al. | 398/91 |
| 3,720,884 A * | 3/1973 | Kelley et al. | 372/25 |
| 3,782,828 A * | 1/1974 | Alfano et al. | 356/318 |
| 4,199,685 A * | 4/1980 | Hora et al. | 250/423 P |
| 4,943,700 A | 7/1990 | Hughes et al. | |

(Continued)

FOREIGN PATENT DOCUMENTS
DE 199 33 231 A1 1/2000
(Continued)

OTHER PUBLICATIONS
Braun et al., Self-channeling of high-peak-power femtosecond laser pulses in air, Optics Letters v. 20, No. 1, Jan. 1, 1995. pp. 73-75.*
(Continued)

*Primary Examiner* — M. Alexandra Elve
(74) *Attorney, Agent, or Firm* — Rothwell, Figg, Ernst & Manbeck, P.C.

(57) ABSTRACT

The invention relates to a method for material processing and/or material analysis of an object (18) made from condensed matter by means of a laser (12). A laser pulse (14) is generated by a laser, emitted in the direction of the object. The laser pulse is spatially and temporally focussed such as to give a peak power for the laser pulse at a point between the laser and the object which exceeds the critical power for a self-focussing effect of the laser pulse. The laser pulse thus forms a filament (88) of high power density. The filament (88) is directed at the object and generates an aggregation state change there (evaporation or plasma formation) for a part of the material of the object. The method can be applied to both material processing (cutting, drilling, welding, hardening) and material analysis (analysis of the plasma light).

14 Claims, 6 Drawing Sheets

U.S. PATENT DOCUMENTS

| | | | | |
|---|---|---|---|---|
| 5,022,734 | A | * | 6/1991 | Kashyap ........................ 385/123 |
| 5,317,454 | A | * | 5/1994 | Sharp et al. ................... 359/886 |
| 5,726,855 | A | * | 3/1998 | Mourou et al. ............... 361/213 |
| 6,274,288 | B1 | * | 8/2001 | Kewitsch et al. ........ 430/270.14 |
| 6,768,080 | B2 | * | 7/2004 | Troitski ................... 219/121.69 |
| 7,184,143 | B2 | * | 2/2007 | Chin ............................. 356/318 |
| 2006/0099810 | A1 | * | 5/2006 | Voronov et al. ............... 438/689 |

FOREIGN PATENT DOCUMENTS

WO        WO 00/67003    A1    11/2000

OTHER PUBLICATIONS

Schillinger et al., Electrical conductivity of long plasma channels in air generated by self-guided femtosecond laser pulses, Appl. Phys. B v. 68, No. 4, 1999. pp. 753-756.*

Tzortzakis et al., Long connected plasma channels in air produced by ultrashort UV laser pulses, Quantum Electronics and Laser Science Conference, San Francisco, CA May 2000, pp. 143-144.*

Kasparian et al., "The critical laser intensity of self-guided light filaments in air", Appl. Phys. B., 71, 877-879, (2000).

* cited by examiner

METHOD FOR MATERIAL PROCESSING AND/OR MATERIAL ANALYSIS USING LASERS

CROSS REFERENCE TO RELATED APPLICATION

This application is a 35 USC §371 National Phase Entry Application from PCT/EP03/02074, filed Feb. 28, 2003, and designating the U.S.

TECHNICAL FIELD

The invention relates to a method of material processing and/or material analysis of an object of condensed substance using a laser.

Material processing is understood as a plurality of processing methods, wherein the material undergoes heating or evaporation, for example cutting, drilling, welding or hardening of materials.

In the material analysis which is relevant here a plasma lightening is generated by a laser, and is analyzed in such a way that conclusions can be drawn with respect to the material.

Condensed substance is liquid or solid substance. The evaporation of the substance as well as the generation of a plasma lightening comprises a change of the state of aggregation of the material.

PRIOR ART

Various methods of material processing or material analysis using a laser are known. In many of such methods the laser beam is focused on the object in such a way that a laser focus is generated, in which the laser power is very high. This high laser power in the focus causes a change of the state of aggregation (evaporation or formation of a plasma) of the material of the object. This is used for the processing of material such as cutting, drilling, welding or hardening or for the material analysis by means of plasma formation.

From DE 199 33 231 A1 a method of material processing of an object from condensed substance using a laser is known, wherein a laser pulse is generated by means of a pulsed laser and the laser pulse is directed towards the object. The DE 199 33 321 A1 discloses an optical pulse amplifier system converting long laser pulses with low intensity to ultra short laser pulses with high energy by using optical parametrical amplifier media. These ultra short laser pulses are led to an application unit. This application unit may be a tool machine or a surgical instrument. The ultra short light pulses can be, for example, in the range of femto seconds.

From WO 2000 67 003, a method of material analysis of an object using a laser is known, wherein the object is exposed to a series of laser pulses with a pulse width of less than 10 ps in the focus. The intensity of the laser pulses in the focus is selected such that the material of the object is evaporated. The composition of the evaporated material is analyzed by means of, for example, a mass spectrometer.

For all these methods, it is necessary to focus the laser beam by focusing means, for example a lens. As the focus generated thereby is geometrically very much limited in the direction of the laser beam, this process requires the distance between the point of processing of the object or the work piece and the focusing means to be very accurately adjusted and maintained. This distance typically is several millimeters to several centimeters. In many applications this distance is not constant in time and a time control of the focus in the direction of the laser beam is required. A mechanical system for moving the focusing means is used for this purpose. For many applications the control of the focus must be effected very quickly. This is expensive and for some applications even not possible.

Applications, wherein the method of material processing and/or material analysis require a control of the focus are, for example, drilling, cutting of non-planar work pieces (for example a bent metal sheet) along a line or the material analysis of things which are sorted on a carrier belt.

Furthermore there are LIDAR-Systems ("Light Detection and Ranging") known in a different technical field, which make use of laser systems generating laser pulses with a peak power exceeding the critical power for a self-focusing effect of the laser pulse (s. Kasparian, J. et al.: "The critical laser intensity of self-guided light filaments in air" in Appl. Phys. B. Vol. 71, p. 877-879 (2000)). Such systems are called "white light-LIDAR", because, contrary to classical LIDAR, not the laser light itself but the generated white light is used as measuring light. Thereby multispectral simultaneous measurements are possible for—amongst others—several air pollutants and green house gases. LIDAR systems, however, are not used for material processing or material analyses of an object of condensed substance.

DISCLOSURE OF THE INVENTION

It is an object of the invention to provide an effective method of processing material and/or analyzing material with lasers where control of the laser focus in the direction of the laser beam is not necessary.

According to the invention this object is achieved by a method of material processing and/or material analysis of an object of condensed substance using a laser with the methods steps of generating a laser pulse by means of a pulsed laser, emitting said laser pulse in the direction of said object, and focusing of the laser pulse in time and space in such a way that the peak of the laser pulse exceeds the crucial power for a self-focusing effect of the laser pulse at a position between the laser and the object so that a filament is formed by the laser pulse, and the filament extends at least to the surface of the object and causes a change of the state of aggregation of part of the material of the object without re-adjusting the laser focus.

If a high intensity, ultra short laser pulse (in the range of femto seconds and terawatts) is emitted in a gas (for example the atmosphere), non-linear optical effects occur. Due to the high occurring field strength, the diffraction index of gas— and air molecules is increased by the Kerr-effect also. As the intensity profile of the laser beam is about bell-shaped across the cross section of the laser beam, this increase of the diffraction index and, thereby, the reduction of the light velocity is smaller at the edges of the laser beam than in the central region of the laser beam. The gas or air acts like a focusing lens in this range of extremely high field strengths. Thereby, the laser beam is focused. By this focusing of the laser beam, which has a high intensity anyway, an extremely high energy density occurs leading to a multi-photon or field ionization of the gas or the air. The ionization leads to a change of the diffraction index of the gas or the air. This change of the diffraction index depends on the light intensity, though, however, the diffraction index is reduced depending on the light intensity. As the profile of the light intensity of the focused laser beam also corresponds to a bell-shaped curve over the cross section of the laser beam, the ionized areas act as a divergent lens. The laser beam is focused de-focused again. Thereby a state is reached again, wherein the Kerr-effect is effective and the laser beam is re-focused. This means, that alternating a focusing and de-focusing of the laser beam is effected just as by alternating arranged collimating and divergent lenses, and this is caused by the respective states of the laser beam itself. A "self-focusing" and "self-defocusing" occurs. This leads to tube with a diameter of, for example, 100 µm with ionized sections determined by the pulsed, high-intensity beam of laser light which does not essentially diverge over long distances. Such a state caused by the beam of laser light is called "filament". Theoretical considerations of the interactions of such effects are, amongst others, described in the publication "Self-channeling of high-peak-power femto second laser pulses in air" by A. Braum et al. in Opt. Lett., Vol. 20, No. 1, p 73-75 (1995) and in the publication "The critical laser intensity of self-guided light filaments in air" in Appl. Phys. B, Vol 71, p 877-879 (2000).

The invention is based on the realization, that such a filament has a similarly high intensity in a range extending in the direction of the laser beam as the laser focus in known laser systems for material processing or material analysis which is substantially limited in the direction of the laser beam. The high intensity range (the filemant) spacially extends in one direction (i.e. in the direction of the laser beam), which means that the power density of the "focus" is maintained over large distances. For generating the required high power density at spatially different points along the laser beam no control system for re-adjustment is necessary with the present invention, as required in known devices for controlling the focus in the direction of the laser beam depending on the characteristics of the object.

Using the method according to the invention, there are certain applications requiring a relative movement between the object and the laser beam in directions extending perpendicular to the laser beam (for example for cutting or sorting). This relative movement in a direction extending perpendicular to the laser beam is carried out just like in the known systems. The laser beam can be deviated temporally or a relative movement between the object and the laser system can be effected.

The method according to the invention can advantageously be used for all applications in material processing and/or material analysis where a high power density is required. The method is particularly advantageous for applications where the position of the laser focus must be varied in time in the direction of the laser beam. This is in the case of material processing for example drilling and cutting of thick objects or the cutting of non-planar objects, but also welding or hardening, if the processing line is not in a flat plane.

A further field of applications of the method according to the invention is the material analysis or material diagnostics. It is known that gaseous substances can be very well determined with lasers, because they have a spectral signature which can be well identified. Solid and liquid substances, however, do not have a well identifiable spectral signature. For the material analysis of condensed substance it is, therefore, advantageous to excite the material to a plasma lightening and to investigate the spectral signature of the plasma lightening to draw conclusions regarding the composition of the material of the object in such way. In this method parts of the objects are ionized and excited to a plasma lightening. This plasma lightening is then analyzed, for example with a spectrometer with a multi-channel array, while certain plasma lines which are specific for the substance are used for the identification. In such a way copper, for example, can be detected by typical copper lines and the salt compound by the sodium line. Methods for investigating the plasma lightening for material analysis are known as such and are not described here in further detail.

An application where the method according to the invention for material analysis can be used is the sorting of objects depending on the material composition, for example the sorting of garbage. The objects (for example garbage) is conveyed on a conveyor belt and analyzed right on the conveyor belt by means of the method according to the invention. According to the result of the analysis of the plasma lightening a mechanical device, for example a flap, can be controlled to effect the sorting of the objects. Such conveyor belts with sorting devices are known as such and are not described here in further detail. Such objects lying on a conveyor belt usually have different sizes so that the distance of the individual objects and the laser system is not constant. The method according to the invention is here very useful. Compared to the conveyor belt garbage sorting by means of a laser analyzing method according to the prior art, the present invention enables a conveyor belt to operate at higher speed so that the separating of garbage can be carried out in a much more economical way.

Contrary to the known plasma analysis method by means of laser excitation the method according to the invention enables a plasma analysis over long distances. With known laser systems of this kind the distance between the laser system with the focusing means and the object to be analyzed is very small and normally does not exceed 0.5 m. Distances in the range of 1-2 m require very expensive systems, larger distances are not possible at all. All those distances between the laser system and the object to be analyzed can be manifold exceeded by the method according to the invention. The plasma lightening is then preferably received with a telescope so that the plasma analyzing system may also be at a large distance from the object to be analyzed. Thereby the material analysis is possible, with the method according to the invention, even in environments which are difficult to access or not human-friendly, for example for sorting dangerous good (for example radioactive waste), inside a tank for chemicals, with a hot metal molten mass or in damaged areas, which cannot be entered.

Further applications of the method according to the invention can be found in medical treatment. The method according to the invention can be applied as a laser treatment method wherever nowadays conventional laser treatment methods operating with a laser focus are applied and the risk of damage does not hinder the use of it. The method according to the invention can be particularly advantageously applied for dental treatment, because then the risk of damaging the surrounding tissue is small.

Further modifications of the invention are subject matter of the subclaims.

Embodiments of the invention are described below in greater detail with reference to the accompanying drawings.

BRIEF DESCRIPTION OF THE DRAWINGS

FIG. 1 is a schematic view and illustrates the formation of the filament by a high-intensity pulsed laser beam with.

PREFERRED EMBODIMENT OF THE INVENTION

Figure 4:
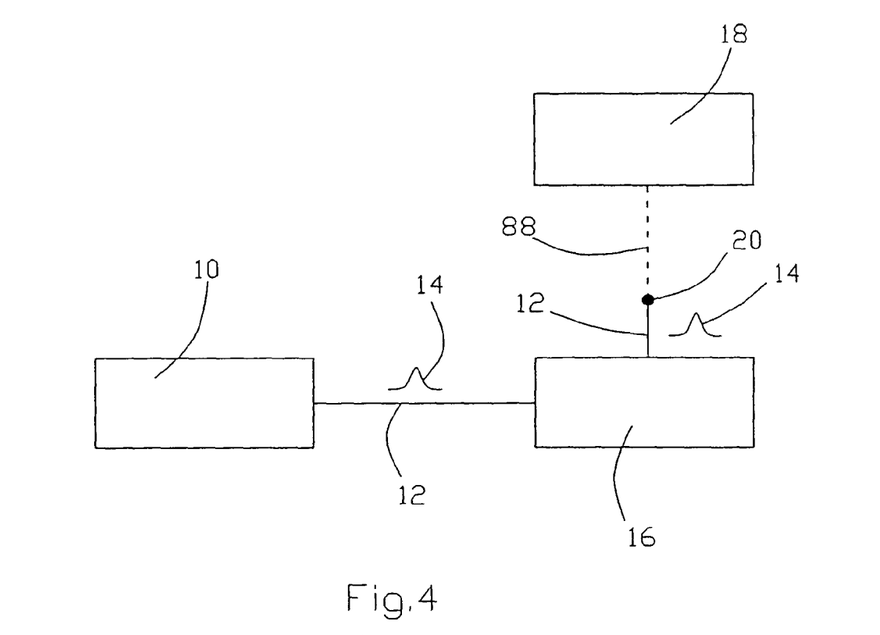
FIG. 4 is a schematic view of a device for material processing of an object of condensed substance.

In FIG. 4 a device for material processing of an object of condensed substance is schematically shown. Numeral 10 designates a laser assembly for the generation of a laser beam 12 in the form of a series of high-energy laser pulses 14. The laser pulses 14 can be provided with a "negative Chirp", i.e. they are spectrally dispersed, the wavelengths running slower in the propagation medium forming the front flank of the laser pulse and the wavelengths running faster forming the rear flank of the laser pulse ("negative chirp"). The laser beam 12 is guided to an object 18 by optical means 16 for processing. The laser pulses 14 are focused in time and space (by means of known, suitable optical means) so that the peak power of the laser pulse 14 exceeds the critical power for a self-focusing effect of the laser pulses 14 in the position 20 between the optical means 16 and the object 18, so that a filament 88 is formed by the laser pulses 14. The filament 88 extends at least up to the surface of the object 18. The laser power inside the filament 88 is so high, that it causes evaporation of the material of the object 18, leading to the material processing, for example in the form of cutting, drilling, welding or hardening.

Figure 5:
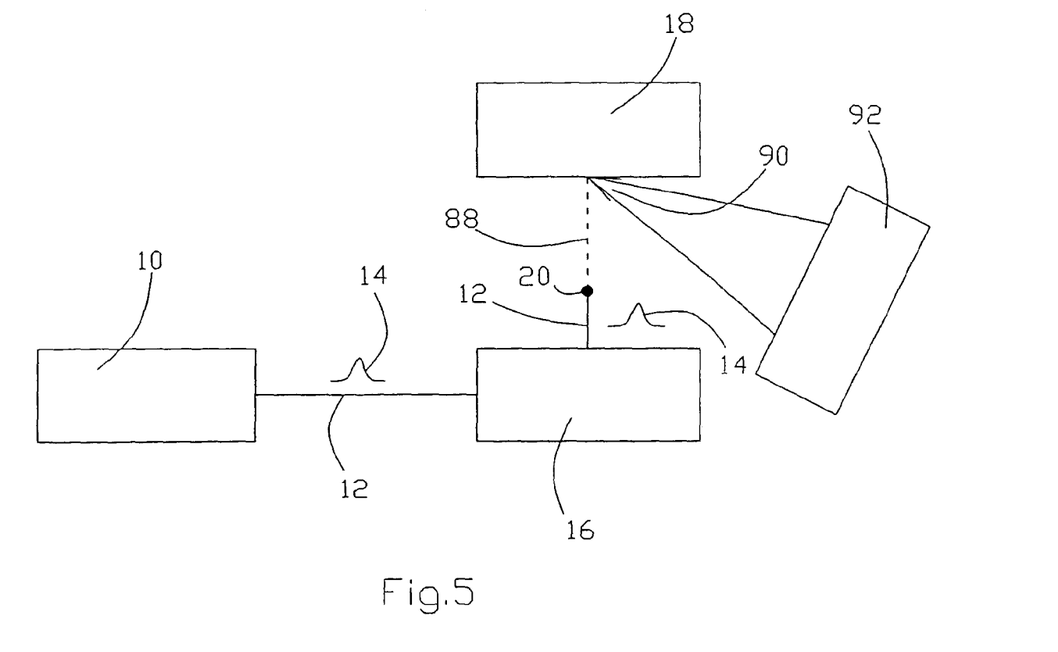
FIG. 5 is a schematic view of a device for the material analysis of an object of condensed substance.

In FIG. 5 a device for the material analysis of an object of condensed substances is schematically shown. The filament generating system with a laser assembly 10 and optical means 16 is substantially identical with the system shown in FIG. 4. In this device for material analysis the substance of the object 18 is excited by the filament 88 to plasma lightening 90. The plasma lightening is analyzed in a known way by means of an analyzer 92.

Figure 6:
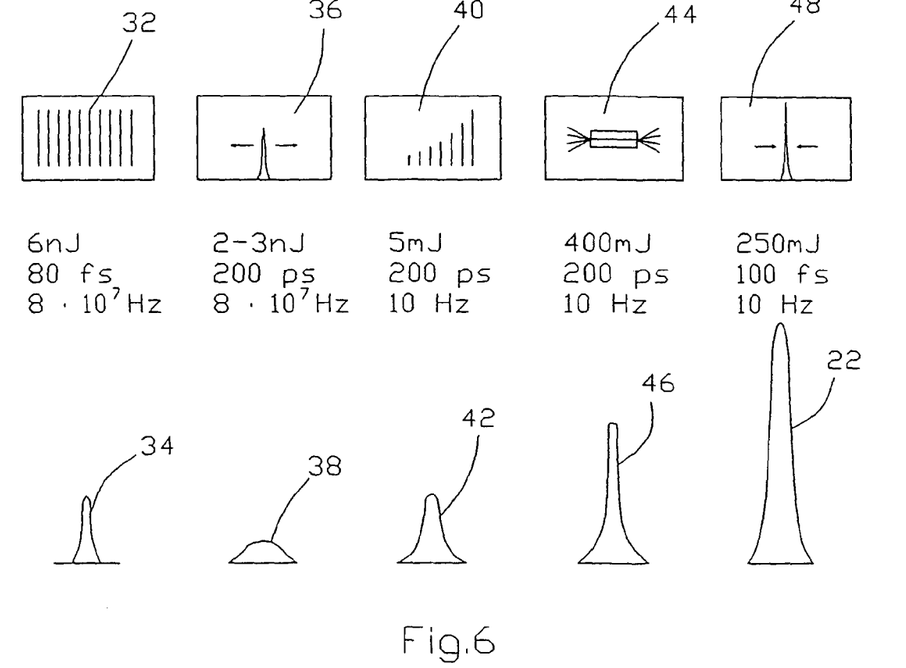
FIG. 6 is a schematic illustration of the generation of very short, high-intensity laser pulses.
Figure 7:
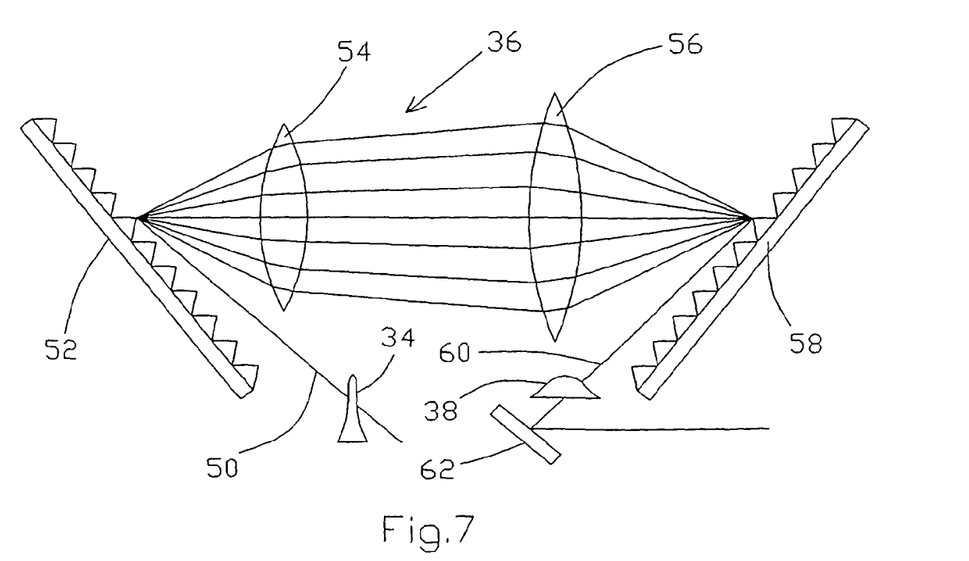
FIG. 7 schematically shows a pulse stretcher for the generation of a spectral dispersion of the laser pulse.
Figure 8:
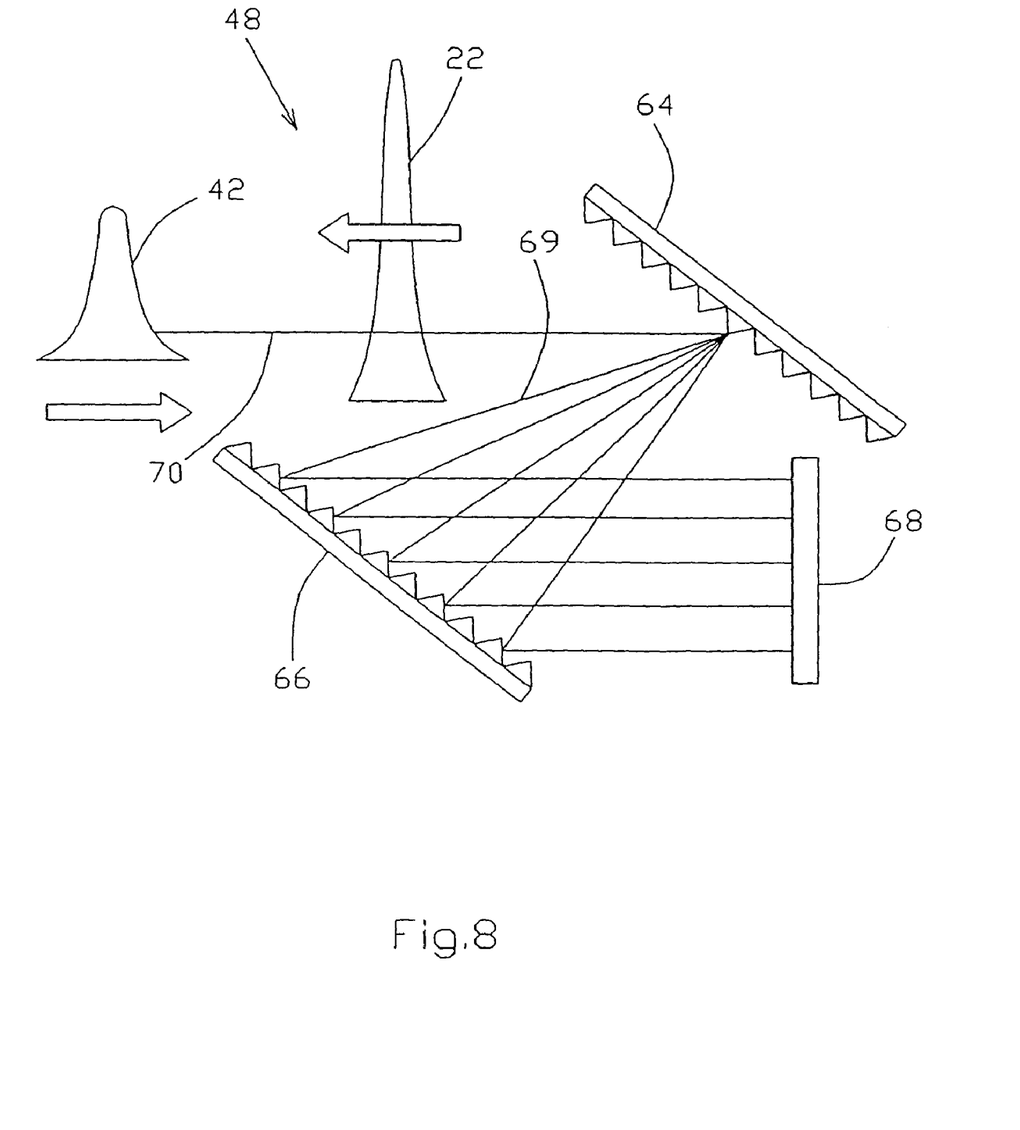
FIG. 8 schematically shows a pulse compressor for the generation of a short, high-intensity laser pulse.

FIG. 6 to 8 schematically show the generation of the emitted laser pulse.

A laser 32 generates a series of short laser pulses 34 of, for example, 80 fs with small energy of, for example, 6 nJ with a frequency of, for example, $8*10^7$ Hz. These laser pulses are converted to spectrally dispersed, relatively long laser pulses 38 of, for example, 200 ps duration and a smaller intensity of 2 to 3 nJ, also with a frequency of $8*10^7$ Hz by means of a pulse stretcher 36. A regenerating amplifier 40 selects individual pulses and amplifies such laser pulses 42 of 200 ps duration and medium range energy of, for example, 5 mJ at a frequency of, for example, 10 Hz. These laser pulses 42 are amplified with an amplifier 44 with several passages to laser pulses 46 with high energy of, for example, 400 mJ, the pulse duration and frequency remaining unchanged. The spectrally dispersed laser pulses 46 obtained in such way are then compressed by a compressor 48 to very short and very intensive laser pulses 22, which are emitted by the laser assembly 10 (FIGS. 4 and 5).

FIG. 7 schematically shows the set-up of the pulse stretcher 36. The laser pulse 34 falls on a grating 52 in the form of a beam 50 in high order. The laser light is wavelength diffracted at the grating 52. The diffracted light is collected by lenses 54, 56 on a second grating 58, as schematically shown. The light of the different wavelengths is then again superimposed to a spacial beam 60 by the second grating 58. As the various wavelengths travel different geometric path lengths between the gratings the laser pulse 38 is widened in the beam 60 and spectrally dispersed. The beam 60 is then deflected by a mirror 62. Then the laser pulse 38 in the beam 60 is processed by the amplifiers 40 and 44 in FIG. 6 and then falls onto the compressor 48 as a laser pulse 46.

The compressor 48 is schematically shown in FIG. 8. The compressor 48 also comprises two gratings 64 and 66 and a mirror 68. The laser pulse 42 falls onto the grating 64 as a beam 70 and is diffracted depending on the wavelength. The beam 69 which is spacially spectrally dispersed at the grating 64 falls on the second grating 66 which extends parallel to the first one. The different wavelengths are diffracted by the second grating 66 in such a way that a bundle of parallel beams which are also parallel to the beam 69 is generated, and a certain wavelength can be allocated to each one of them. The beams of such bundle are reflected by a mirror 68 and spacially unified to one returning beam by the two gratings 64 and 66. In this assembly, the geometrical path taken by the— fast—beams with short wavelengths is longer than the path taken by the slower beams with long wavelengths. Thereby a compression to an intensive but short laser pulse 22 is effected.

In certain cases, if the distance between the laser and the object is very large, the compressor 48 can be designed in such a way that the emitted laser pulse 22 exhibits a "negative Chirp", i.e. remains spectrally dispersed in such a way that the short wavelengths occur in the range of the back flange of the laser pulse 22 and the longer wavelengths in the range of the front flange of the laser pulse 22. The generation of a negative chirp as such is known and, therefore, is not described here in detail.

At high energy density and field strength of the laser pulse with pulse durations in the range of femto seconds and a power in the range of terawatts non-linear optical effects occur. Self-focusing occurs by the Kerr-effect in air. The air acts like a focusing lens. Due to the self-focusing a very high energy density occurs leading to ionization of the air. Such ionization leads to areas acting as a divergent lens. The laser beam with lower energy density running apart in such a way again generates an area acting like a focusing lens due to the Kerr-Effekt and so on. In such a way a self-focusing and -de-focusing of the laser beam occurs.

Figure 1:
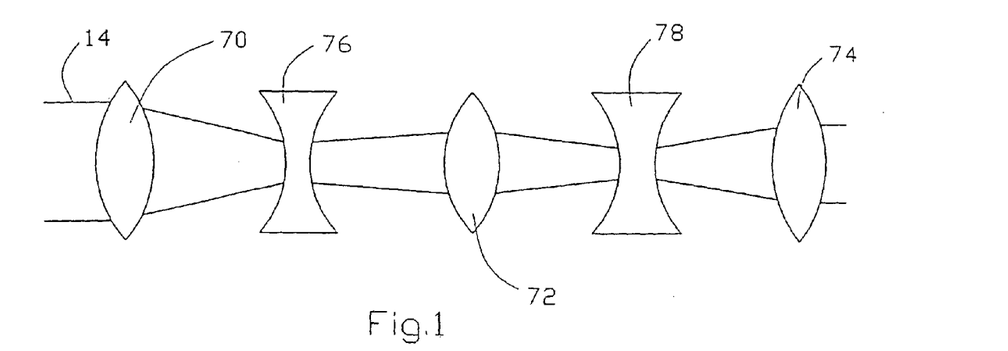
Figure 2:
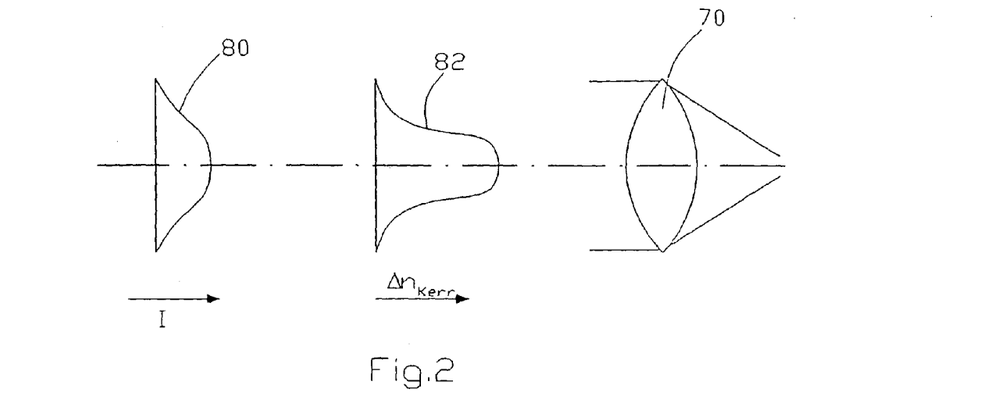
FIG. 2 illustrates the formation of a "collimating lens" by the intensity profile over the cross section of the laser beam and the change of the diffraction index of air caused by the Kerr-effect.
Figure 3:
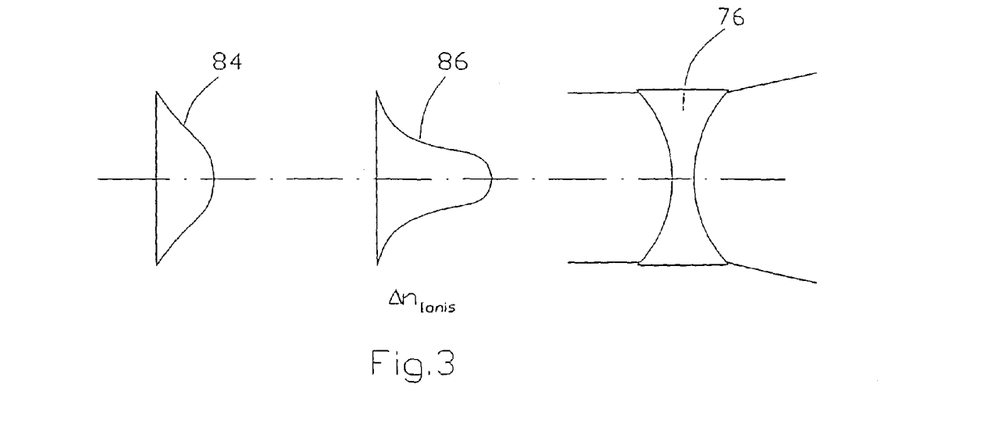
FIG. 3 illustrates the formation of a "divergent lens" by the intensity profile over the cross section of the focused laser beam and the change of the diffraction index of air caused by ionization.

This is schematically shown in FIGS. 1 to 3.

In FIG. 1 numerals 70, 72 and 74 etc. designate "collimating lenses" formed in the propagating medium air by the Kerr-effect with high field strength of the laser pulse 30. "Divergent lenses" 76, 78 etc. are formed between such collimating lenses by ionization of the air. The laser beam 12 is focused by such "collimating lenses" 70, 72, 74 etc. caused by the Kerr-effect. The extremely high power density causes ionization of the air, acting like "Divergent lenses" 76, 78 etc. and causing defocusing. The laser beam is, thereby, guided by self-focusing and -defocusing mainly without running apart. A laser beam guided in such a way with high-intensity and ultra short laser pulses is called "filament".

FIG. 2 illustrates the formation of Kerr-"collimating lenses". The intensity and, thereby, the field strength of the laser beam is not constant over the entire cross section of the laser beam. It has a bell-shaped profile, as represented by the graph 80 on the left side in FIG. 2. This field strength causes a change of the diffraction index of the propagation medium, which change is approximately proportional thereto so that the diffraction index also positively changes over the cross section of the laser beam in a bell-shaped profile. The positive change $\Delta n_{Kerr}$ is shown in the center of FIG. 2 by graph 82. The diffraction index is, therefore, smaller at the edges of the laser beam than in its central region. The marginal beams run faster than the central beams. This is the effect of a collimating lens 70 as shown in FIG. 2.

The intensity or the power density also changes in a focused laser beam over the cross section of the laser beam according to a bell-shaped profile, as shown by a graph 84 in FIG. 3. The profile of the ionization caused by the laser beam is also essentially bell-shaped and correspondingly the change $\Delta n_{Ionis}$ of the diffraction index caused by the ionization, which is represented by graph 86. This change, however, is negative. The diffraction index at the edge of the focused laser beam increases—or decreases to a lesser degree—than in the center. The marginal beams run slower than the central beams. This corresponds to a diverging lens 76 and causes defocusing.

In FIGS. 4 and 5 the filament generated in such a way is shown in dashed lines and designated by numeral 88. For large distances between laser and object by selecting a suitable negative chirp, the laser pulse 30 can be caused to be compressed only in a point 20 lying at a distance from the laser assembly 10 and the optical means in such a way that a field strength sufficient for the formation of the filament 88 is obtained. The filament 88, therefore, starts at the point 20.

Figure 9:
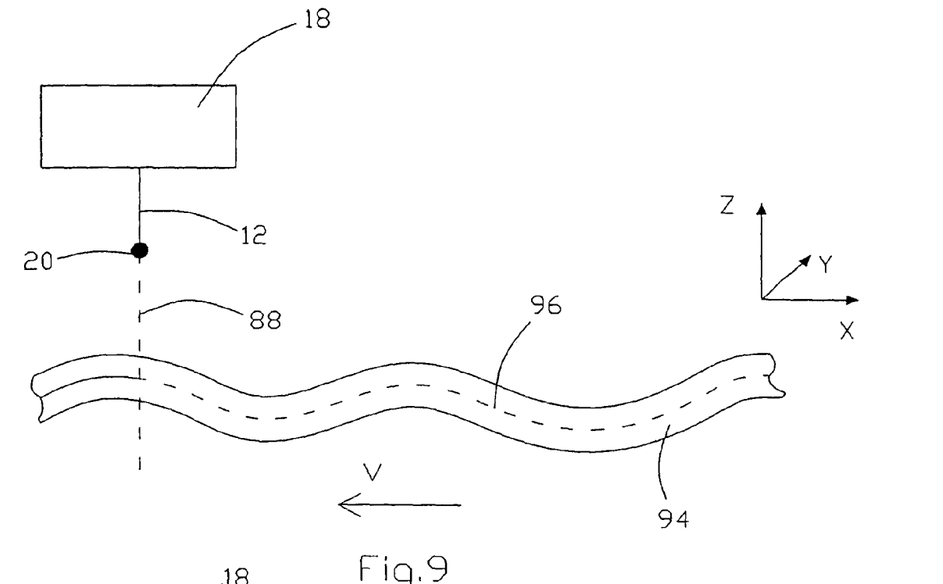
FIG. 9 is a schematic view and illustrates an embodiment for laser material processing of an object.

With reference to FIG. 9, an embodiment of the method of material processing of an object is described using a material processing device according to FIG. 4. Numeral 94 designates an object for processing, for example an undulated sheet metal to be cut along a processing line 96. The laser beam 12 of the device according to FIG. 4, only the optical means 18 are shown in FIG. 9, is directed such that it points perpendicular onto the metal sheet in Z-direction. The metal sheet 94 is mounted in a mounting device (not shown) which is moveable in a X-, Y-plane perpendicular to the Z-direction. Depending on the given processing line 96 the metal sheet 94 is moved in the X- and Y-directions by the mounting device, for example with a certain speed v in the X-direction to the left in FIG. 9. The filament 88 is generated in the point 20 and extends through the metal sheet 94 at each moment during the cutting without the necessity of re-adjusting a laser focus.

Figure 10:
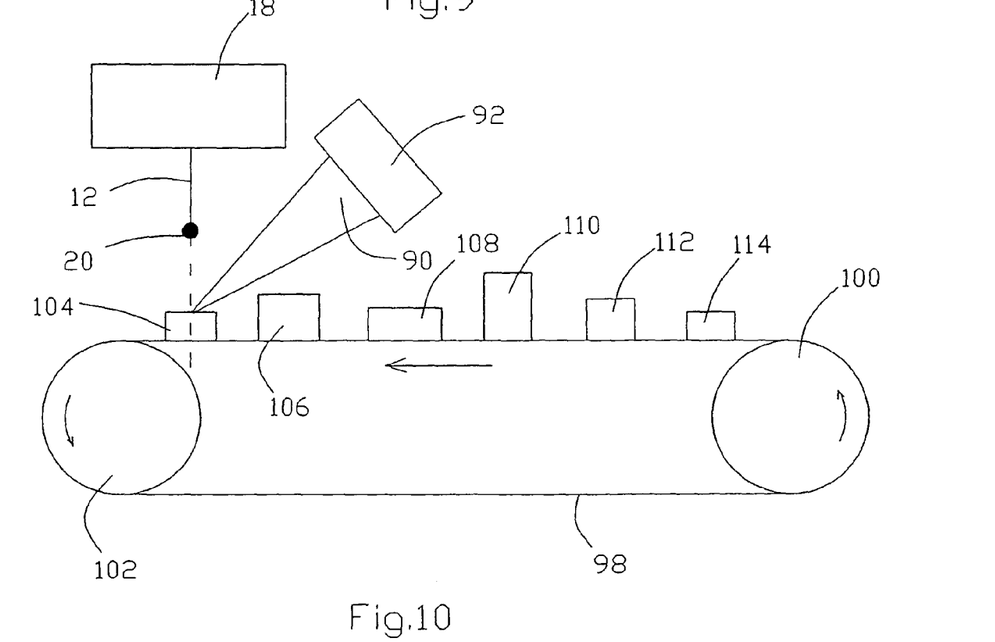
FIG. 10 is a schematic view and illustrates a first embodiment of the material analysis.

With reference to FIG. 10, a first embodiment of a method of material analysis of an object is described using a material analyzing device according to FIG. 5. This is a garbage sorting installation. Numeral 98 designate a conveyor belt moving on two rolls 100 and 102. Garbage is loaded onto the conveyor belt 98 at the right end in FIG. 10. The individual garbage pieces are distributed on the conveyor belt. Such individual garbage pieces are schematically shown in FIG. 10 and designated by numerals 104, 106, 108, 110, 112 and 114. The laser beam 12 of the device in FIG. 5, shown only with optical means 18 and the analyzing device 92 in FIG. 10 is directed in such a way that it is directed towards garbage pieces on the conveyor belt 98 in a certain area. Beam deflecting means (not shown) can be provided for deflecting the laser beam 12 in the plane of the conveyor belt 12 to scan the garbage pieces 104, 106, 108, 110, 112 and 114 in a direction perpendicular to the conveying direction. If the individual garbage pieces 104, 106, 108, 110, 112 and 114 reach the point of the filament 88 they are excited to plasma lightening 90. The plasma lightening is analyzed by the analyzing device 92. Depending on the result of such analysis of the plasma lightening 90 a mechanical sorting device (not shown) is controlled, the device being arranged near the left end in FIG. 10 of the conveyor installation and separating the garbage pieces 104, 106, 108, 110, 112 and 114 depending on the material composition.

Figure 11:
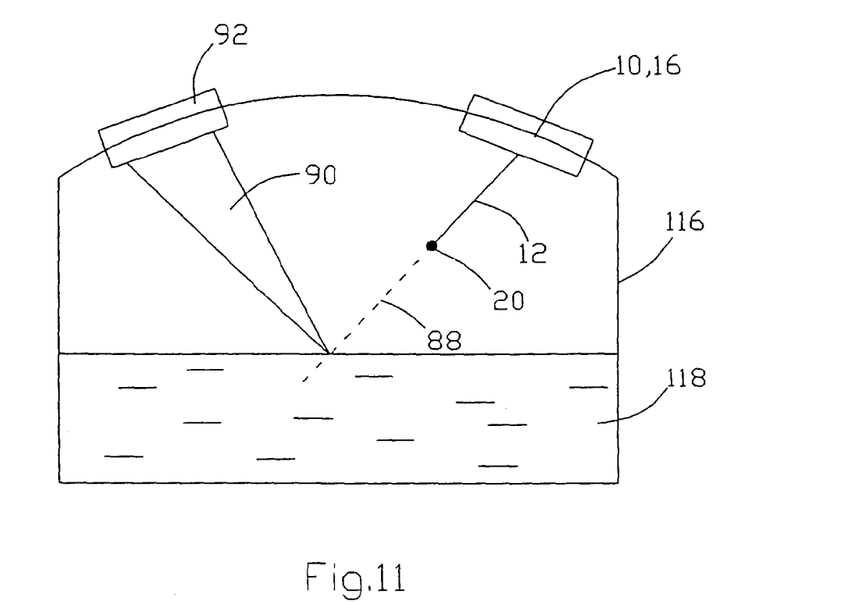
FIG. 11 is a schematic view and illustrates a second embodiment of the material analysis.

Referring to FIG. 11, a second embodiment of a method of material analysis of an object is described using a material analyzing device according to FIG. 5. Numeral 116 designates a tank for chemicals with a molten mass 118, the material composition of which shall be analyzed. The system 10, 16 (see FIG. 5) for generating the filament 88 and the analyzing device 92 is flanged to the tank for chemicals 116. The filament 88 excites the molten mass 118 to plasma lightening 90 which is analyzed by the analyzing device 92. The level of the tank for chemicals is not critical because the filament 88 provides the energy required for plasma excitation over a long distance.

Figure 12:
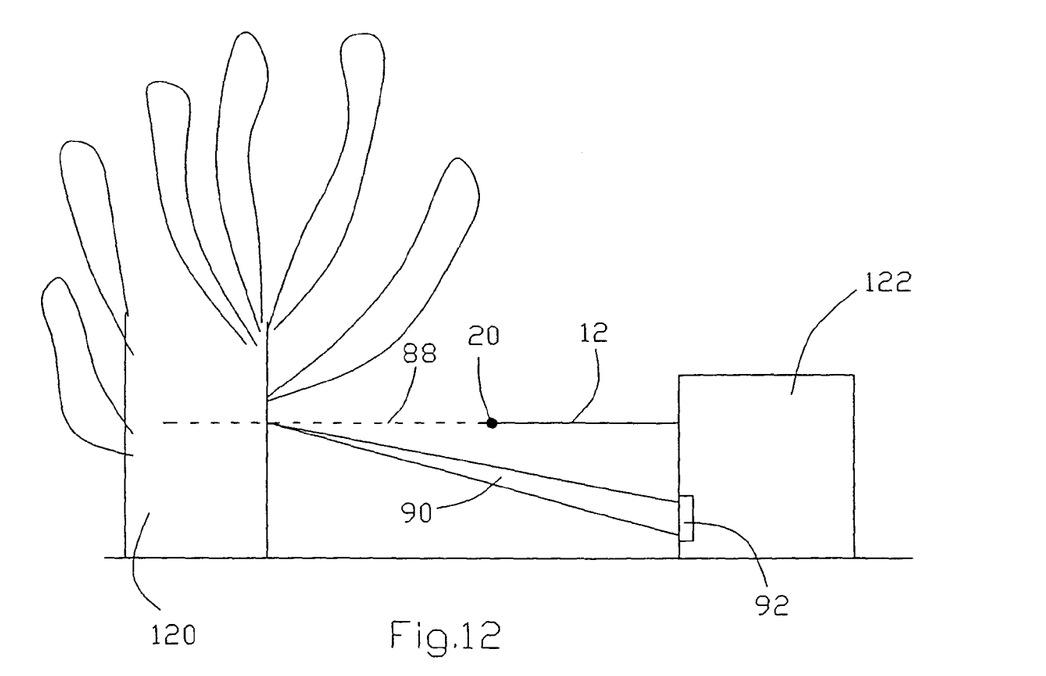
FIG. 12 is a schematic view and illustrates a third embodiment of the material analysis.

In FIG. 12 a third embodiment of a method of material analysis of an object is described using a material analyzing device according to FIG. 5. It is the material analysis of objects in an environment which is difficult to access, such as damaged areas. Numeral 120 designates a burning building. It is the object to analyze the materials in this building, for example to determine whether there is a danger by poisonous gases or not. For this purpose the device shown in FIG. 5 is mounted in a moveable container 122. The container is transported to a position near the building 120. The building 120 can be scanned by the filament 88. The filament 88 excites the material to be investigated to plasma lighting 90, which then is analyzed by the analyzing device 92. Thereby a very quick and safe analysis can be carried out.

The invention claimed is:

1. A method of processing an object of condensed substance using a laser comprising the steps of:
   (a) generating a laser pulse by means of a pulsed laser, wherein said laser pulse is negatively chirped such that it is spectrally dispersed with wavelengths running slower in the propagation medium forming a front flank of the laser pulse and wavelengths running faster forming the rear flank of the laser pulse;
   (b) emitting said laser pulse in the direction of said object;
   (c) focusing said laser pulse in time and space so that
      (c1) the peak of the laser pulse exceeds the crucial power for a Kerr-induced self-focusing effect of the laser pulse at a position remote from the laser and said object so that a filament is formed by the laser pulse, and
      (c2) the filament extends from said remote position through air at least to the surface of said object; and
   (d) causing evaporation or excitation to plasma of at least part of said object without re-adjusting the laser focus.

2. The method of claim 1, wherein a series of laser pulses is generated by the pulsed laser.

3. The method of claim 1, wherein the pulse width of the laser pulse is smaller than $10^{-14}$ s.

4. The method of claim 1, wherein the exit power of the pulsed laser is larger than $10^{11}$ W.

5. The method of claim 1, wherein the object for processing or analyzing is a solid state body.

6. A method of analyzing an object of condensed substance using a laser, comprising the steps of:
   generating a laser pulse by means of a pulsed laser;
   emitting said laser pulse in the direction of said object, wherein said laser pulse is foamed such that the peak of the laser pulse exceeds the crucial power for a Kerr-induced self-focusing effect of the laser pulse at a position remote from the laser and said object to form a filament that extends from said remote position through air at least to the surface of said object;
   causing evaporation or excitation to form a plasma of at least a part of said object; and
   analyzing the plasma or evaporated part of said object by spectral analysis to determine at least one characteristic of said object.

7. The method of claim 1, wherein said processing is cutting, drilling, welding or hardening.

8. The method of claim 1, wherein said processing is for medical treatment.

9. The method according to claim 6, further comprising:
   controlling a mechanical device configured to sort said of objects, wherein said control is dependent upon a result of said analysis.

10. The method according to claim 6 for analyzing the contents of a container,
    said object comprises a molten mass of material having a surface level within the container, and
    the filament extends from said remote position to the surface of said object despite variations in the surface level of the molten mass.

11. The method according to claim 6 for the remote analysis of materials in damaged areas.

12. The method according to claim 1 for dental treatment.

13. The method according to claim 6 for analyzing an environment that is difficult to access due to fire, wherein
    said object comprises materials located within said environment, and
    said laser pulse is emitted from a location outside said environment.

14. A method for material analysis or machining of an object of condensed substance using a laser, said method comprising:
   a) forming a laser pulse by means of a pulsed laser, wherein said fog nation comprises:
      a1) generating a laser pulse,
      a2) stretching said laser pulse using an optical pulse stretcher including a first and second diffraction grating; and
      a3) compressing the laser pulse using an optical compressor including a third and fourth diffraction grating;
   b) emitting said laser pulse in the direction of said object; and
   c) generating a filament in air at a position remote from the laser and said object that extends from said remote position at least to the surface of said object and causes evaporation or excitation to plasma of at least a part of said object,
   wherein said laser pulse is formed such that the peak of the laser pulse does not exceed the crucial power for a Kerr-induced self-focusing effect of the laser pulse prior to said remote position.

* * * * *